M. M. SPAULDING.
BRAKE.
APPLICATION FILED NOV. 20, 1917.
1,268,507.
Patented June 4, 1918.
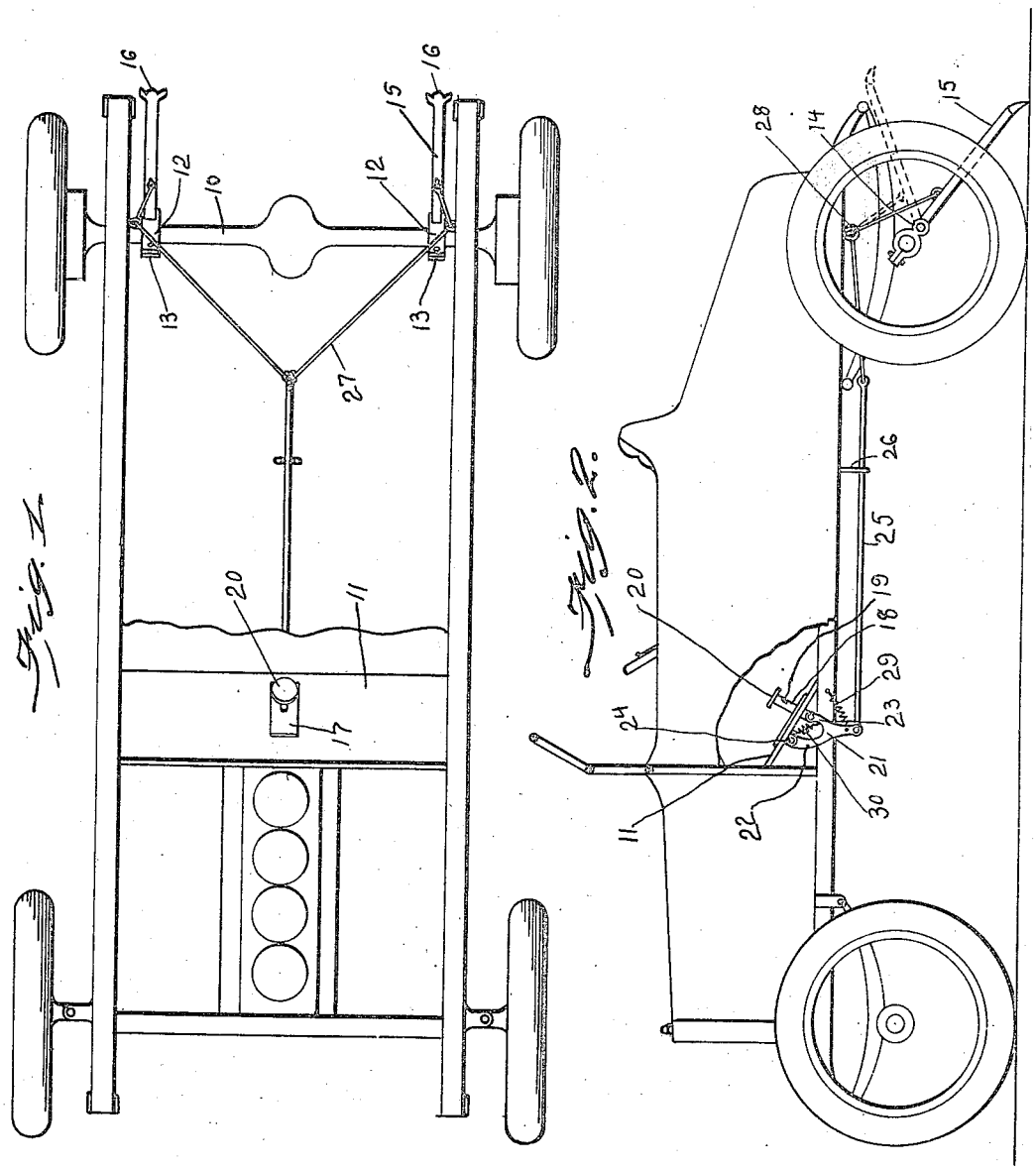
WITNESSES
INVENTOR
Morton M. Spaulding
ATTORTEY

UNITED STATES PATENT OFFICE.

MORTON M. SPAULDING, OF NORTH ADAMS, MASSACHUSETTS.

BRAKE.

1,268,507.　　　　　　Specification of Letters Patent.　　Patented June 4, 1918.

Application filed November 20, 1917. Serial No. 202,997.

*To all whom it may concern:*

Be it known that I, MORTON M. SPAULDING, a citizen of the United States, residing at North Adams, in the county of Berkshire and State of Massachusetts, have invented certain new and useful Improvements in Brakes, of which the following is a specification.

This invention has relation to brakes for motor vehicles or the like and has for an object to provide a device for application to the axle of an automobile and adapted to be lowered into engagement with the road bed to prevent rearward movement of the vehicle and for other purposes.

Another object of the invention is to provide a pair of pointed elements mounted on an axle of a motor vehicle, and means operable by the driver to lower the elements when desired for engagement with the road bed to securely hold the vehicle against rearward movement.

In addition to the foregoing my invention comprehends improvements in the details of construction and arrangement of the correlative parts to be hereinafter more fully described and particularly set forth in the appended claim.

In the accompanying drawings in which similar and corresponding parts are designated by the same characters of reference throughout the several views in which they appear:—

Figure 1, is a view in plan of the chassis of a motor vehicle illustrating the application thereto of my improved brake, and Fig. 2, is a view in side elevation of the vehicle with parts broken away to show details.

With reference to the drawings, 10 indicates the rear axle of a motor vehicle, and 11 an inclined platform forming a continuation of the floor of the car, and upon which the controlling and operating pedals of the vehicle are located.

Mounted upon the rear axle 10, are a pair of split rings 12 held upon the axle by means of clamping screws 13. Each ring is formed with an apertured enlargement 14 for pivotal connection to an arm 15 forming a brake, a pair of which arms are provided. The lower end of each arm is formed with a plurality of sharpened spurs 16.

Mounted upon the inclined platform, is a slotted plate 17 through which a foot pedal 18 extends, one edge of the bar, the lower edge in the present instance, being formed with a pair of notches 19 for engagement with the plate at the end of the slot. The upper end of the foot pedal is provided with a tread plate 20. Located beneath the platform 11 is a lever 21, bifurcated at its upper end to form a relatively long member 22 and a relatively short member 23, the latter being pivotally connected to the lower end of the bar 18. The longer member 22 is pivotally connected as at 24 to an ear secured to the under side of the platform 11 forming a fulcrum for the lever whereby the lever may be oscillated by depressing the foot pedal 18. The opposite or lower end of the lever 21 is pivotally connected to a longitudinally extending rod 25, the opposite end extending rearwardly into a guide 26 depending from the bar. A pair of flexible elements 27 are connected at one of their ends to the rear end of the bar 25, while the opposite ends are each connected to one of the brake bars 15 at a point intermediate their ends, said flexible element 30 passing through guides 28 depending from the car which guides may be pulleys if desired. A coil spring 29 is provided, having one end connected to the lower end of the lever 21 and the other end to a stationary part of the vehicle frame. A second coil spring 30 is provided having one end connected to the under side of the platform 11 and its other end to that portion of the foot pedal 18 which extends below its point of connection with the lever 21 whereby to retain the edge of said lever in engagement with the end of the slot of the slotted plate 17.

In an inoperative position the foot pedal 18 will be depressed and held in such depressed position against the tension of the spring 29 by engagement of the end of the slotted plate in the uppermost of the notches 19. In this position of the parts, the brake bars 15 will be held elevated and in the position shown in dotted lines in Fig. 2. When the machine is standing on a slope rearward movement thereof may be prevented by kicking the foot pedal 18 forward to disengage the plate 17 from the notch 19 whereupon the lever 21 will be drawn forward under the influence of the spring 29 and the bars 15 permitted to descend and engage in the road bed. The foot pedal will now be in a position to permit the lowermost notch 19 to receive the edge of the slotted plate 17 whereby to retain the parts in this position.

Thus it will be seen that I have provided a brake which may be used in addition to the usual brake equipment of a motor vehicle to securely hold the car against backward movement on a steep slope. The brake bars 15 may also serve to prevent sidewise skidding of the vehicle when lowered for engagement with the road bed. The device comprises few parts and those of a simple nature, insuring positiveness of action and at the same time permitting the device to be economically manufactured and readily applied to vehicles of standard makes.

Having thus described my invention what I claim as new and desire to secure by Letters Patent is:—

In a motor vehicle, the combination with the inclined foot board of a slotted plate mounted thereon having a depending ear, a lever having one end bifurcated to form a pair of members of different lengths, means pivotally connecting the lower member to the ear, a bar provided with a pair of notches pivotally connected to the shorter member and extended through the slotted plate, a sprag brake, and a link connecting said lever to the brake.

In testimony whereof I affix my signature in presence of two witnesses.

MORTON M. SPAULDING.

Witnesses:
C. T. PHELPS,
WM. C. CLIFFORD.